Oct. 14, 1958 L. C. KERKOSKI 2,855,727
GLASS TEMPERING APPARATUS
Filed April 29, 1955 3 Sheets-Sheet 1

INVENTOR.
LLOYD C. KERKOSKI
BY Oscar L. Spencer
ATTORNEY

Oct. 14, 1958    L. C. KERKOSKI    2,855,727
GLASS TEMPERING APPARATUS
Filed April 29, 1955    3 Sheets-Sheet 2
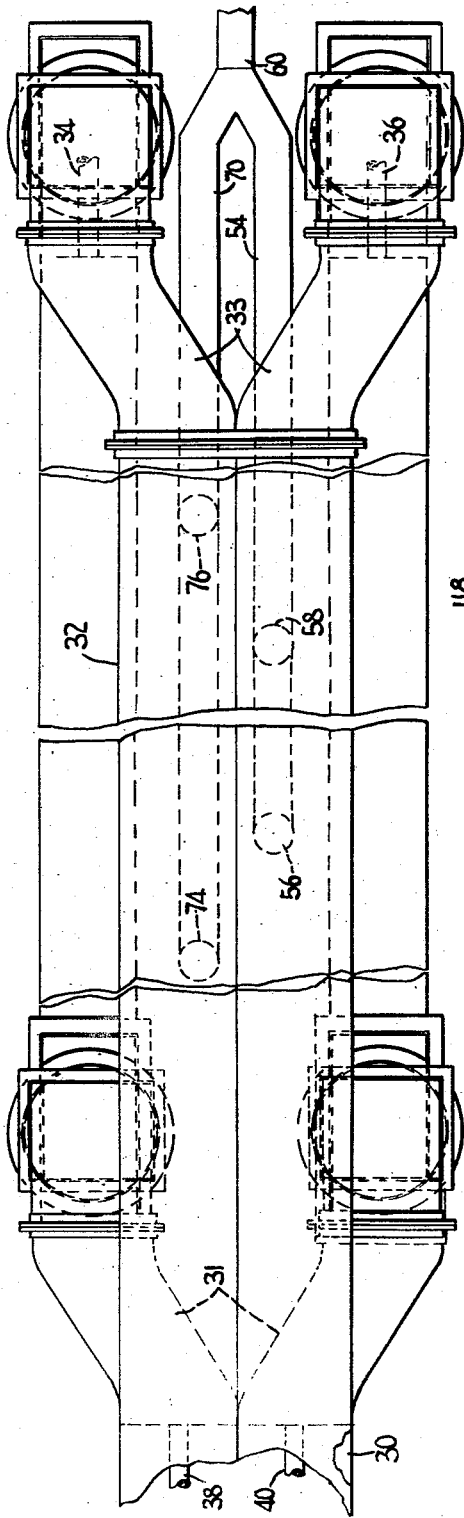
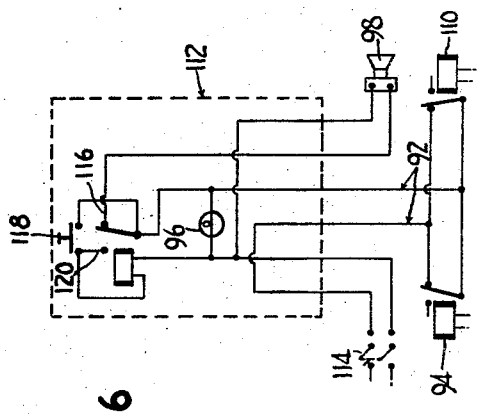
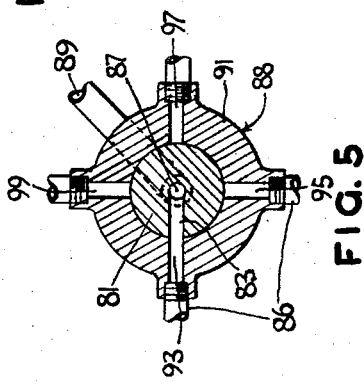
INVENTOR.
LLOYD C. KERKOSKI
BY Oscar Spencer
ATTORNEY Oct. 14, 1958 L. C. KERKOSKI 2,855,727
GLASS TEMPERING APPARATUS
Filed April 29, 1955 3 Sheets-Sheet 3

INVENTOR.
LLOYD C. KERKOSKI
BY Oscar L. Steiner
ATTORNEY

United States Patent Office 2,855,727
Patented Oct. 14, 1958

2,855,727
GLASS TEMPERING APPARATUS

Lloyd C. Kerkoski, Crystal City, Mo., assignor to Pittsburgh Plate Glass Company, Allegheny County, Pa., a corporation of Pennsylvania Application April 29, 1955, Serial No. 504,880

2 Claims. (Cl. 49—45)

The present invention relates to novel improvements in glass tempering apparatus, and particularly concerns the installation of warning devices to insure that the tempering fluid is applied to glass at the proper pressure.

The basic process involved in tempering glass is old and described in prior patents. Such process comprises heating a glass sheet above its annealing range and then rapidly cooling the surfaces of the sheet to set the latter while the center is still hot. This action results in a sheet having its surfaces in compression and an intermediate portion in tension. The sheet is much stronger than untempered glass when provided with such stress distribution. Therefore, when the outer surface or compression skin is broken, the locked up stresses within the glass cause it to shatter into a large number of very small pieces. The uniformity of size of the shattered particles indicates the uniformity of the temper of the glass.

Typical prior art tempering apparatus comprises air boxes spaced from each other to provide a chamber therebetween for the positioning of a glass sheet to be tempered and nozzles through which the air from the air boxes is directed to opposite sides of the glass sheet supported within the chamber formed between the spaced air boxes. The air boxes are movable in closed paths relative to the glass to insure that the tempering fluid blasted through the nozzles provides a uniform temper pattern on the glass.

The speed with which the tempering fluid is blasted onto the opposing glass surfaces is a critical factor in securing the proper tempering of the glass sheets. Speed of application of the tempering fluid is associated with the size and spacing of the nozzles on the air boxes and the pressure with which the fluid is applied. In commercial operations, it is necessary that the sheet be tempered to the proper temper within a predetermined time limit. Otherwise, the rate of production of tempered glass is adversely affected.

When the pressure at which the tempering fluid is applied drops below a critical value dependent upon the criteria expressed above, the glass surfaces are not chilled rapidly enough to provide the proper temper to the glass. Rejects result from such insufficient tempering. Previously, insufficiently tempered sheets were not detected until after the sheets were conveyed from the tempering apparatus to an inspection station. In fact, the inspection station was frequently insensitive to inadequate tempering, thus requiring spot checking by breaking a small portion of tempered glass sheet production and inspecting the break pattern. There was no provision for detecting any low pressure condition in the pressure system supplying tempering fluid for the tempering operation, a frequent cause of such rejects. Before my invention, a considerable number of sheets were improperly tempering before there was any indication of improper tempering due to failure of the pressure supply system.

According to the present invention, whenever the pressure of the tempering fluid supply falls below a desired minimum, this is indicated immediately. Also, means is included for finding the location of any defect in the tempering fluid supply system by localizing the general area of the defect in a very brief time interval.

Accordingly, the principal object of the present invention is to provide in apparatus for tempering glass an electrically operated indicating device that is actuated in response to a drop of pressure below a predetermined pressure and means for determining the location of any break in the tempering fluid supply system rather quickly.

Another object of the invention is to provide a visual and audible signal in combination with glass tempering apparatus to indicate whenever the pressure at which the tempering fluid is imparted to the glass surface falls below the minimum pressure required for any localized portion of the glass sheet tempered.

Still another object of this invention is to provide signaling means in combination with tempering apparatus for imparting temper to glass sheets which have severely curved portions and relatively gently curved portions.

These and other objects of the present invention will be understood more thoroughly after a study of the following description of a particular embodiment of the present invention, specifically adapted for use in the tempering apparatus disclosed and claimed in copending patent application Serial No. 442,513 of James M. Freiberg, filed July 12, 1954, which has matured into U. S. Patent No. 2,790,270 on April 30, 1957.

In the drawings forming a part of the description of a particular embodiment of the present invention, Figure 1 is a front elevational view of tempering apparatus such as described in the above-identified Freiberg application emphasizing the tempering fluid supply portion of the apparatus and showing other parts in phantom;

Figure 2 is a fragmentary top plan view of the fluid supply system shown in Figure 1, with a portion thereof removed in order to show the essential elements of the distribution system to the maximum possible scale;

Figure 5 is a schematic sketch of a four-way valve forming part of the present invention; and Figure 6 is a schematic wiring diagram of a typical alarm silencing relay used with the present invention.

Figure 1:
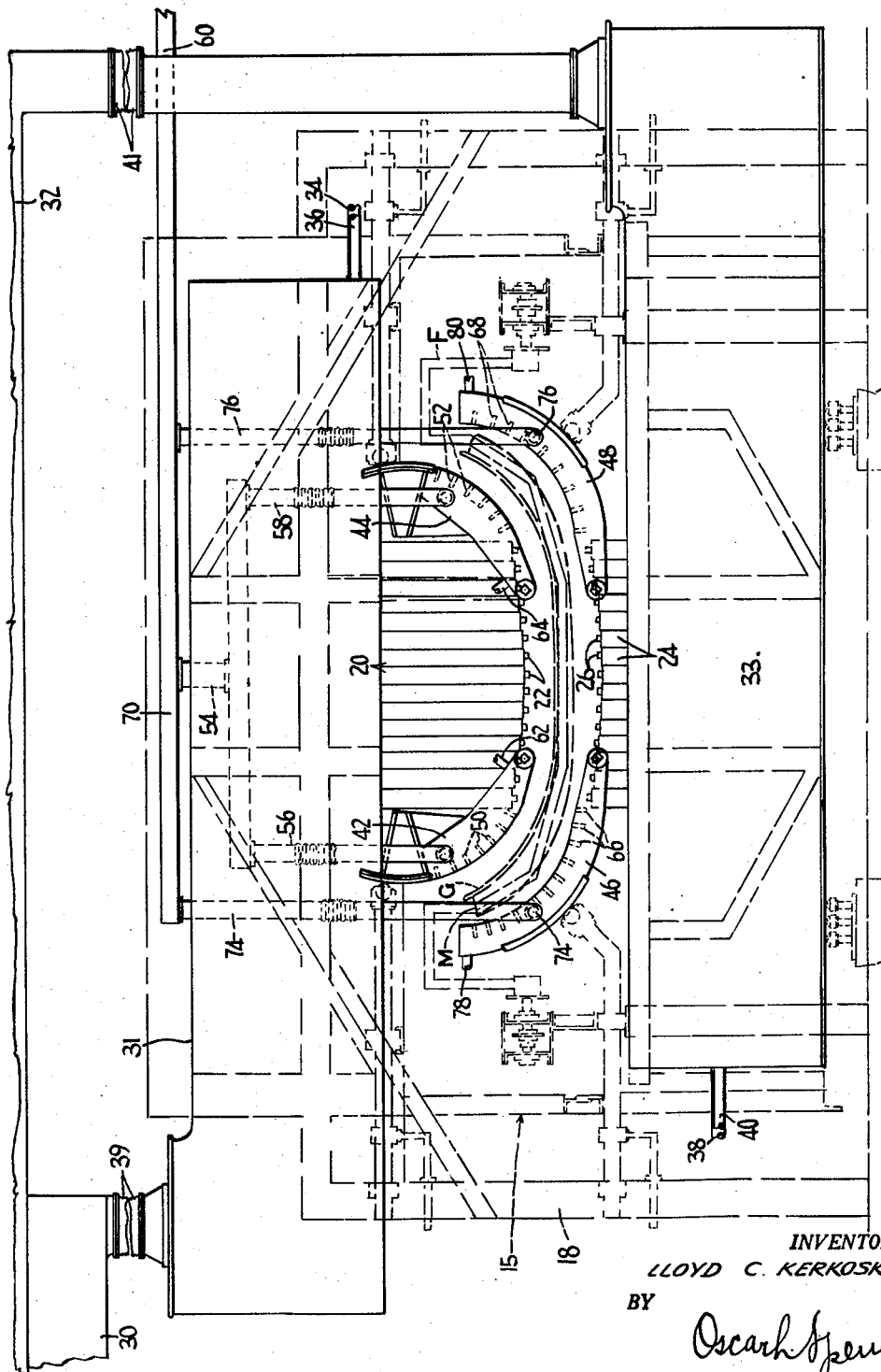

Referring to Figure 1, the tempering apparatus comprising the present invention includes a movable frame housing 15 mounted for orbital movement upon a fixed structure 18. The fixed structure is embedded in the floor of a building containing the tempering apparatus. A detailed description of the particular tempering apparatus may be had by referring to the Freiberg application mentioned above. For purposes of the present invention, a detailed discussion of the tempering fluid supply systems only is sufficient to provide an understanding of what improvements I have made.

Fixed to the movable frame 15 are upper air boxes 20 having downwardly directed nozzles 22 and lower air boxes 24 having upwardly directed nozzles 26. The upper air boxes 20 are connected to an upper air intake 30 comprising two branches 31, while lower air boxes 24 are coupled to lower intake 32 comprising branches 33. Blowers (not shown) are provided to supply air through the upper and lower intakes at a predetermined pressure.

The upper and lower air boxes are spaced to form a chamber adapted to receive a frame F carrying a glass bending mold M which conveys a sheet of bent glass G between the air box nozzles for the chilling step of the tempering process. Sampler pipes 34 and 36 are connected at the end of each branch 31 of the upper intake 30 farthest from the source of air. Similarly, sampler pipes 38 and 40 are coupled to the extremities of the branches 33 of the lower air intake 32. Flexible couplings 39 and 41 connect the upper and lower branches to their intakes, thereby enabling tempering fluid to be imparted from a fixed air source to the air boxes even though there is relative movement between the air boxes and the source of pressurized fluid.

As described in the aforesaid Freiberg application, the sharply curved end portions of glass sheets required for automobile backlights are tempered by supplying comparatively high pressure air through upper wing boxes 42 and 44, and lower wing boxes 46 and 48. Wing boxes 42 and 44 are located at either extremity of the low pressure air boxes 20 and are pivotable relative thereto to follow the contour of the sharply bent extremity of the glass as the air boxes move with the movable frame 15 in a circular orbit relative to the stationary glass G. Wing boxes 42 and 44 are provided with downwardly extending nozzles 50 and 52 respectively, which provide outlets for the high pressure air supplied to wing boxes 42 and 44 from an upper wing box inlet 54 having flexible branches 56 and 58 leading into wing boxes 42 and 44 respectively. The upper wing box inlet 54 is connected to a high pressure blower by means of a coupling pipe 60. Sampler pipes 62 and 64 are connected at the extremity of boxes 42 and 44 respectively, farthest removed from the source of high pressure.

Similarly, lower wing boxes 46 and 48, provided with upwardly directed nozzles 66 and 68, respectively, are pivotable at either extremity of the lower low pressure air boxes 24. Lower wing box inlet 70 connected between coupling pipe 60 and the high pressure blower, is bifurcated into flexible inlet branches 74 and 76 for feeding the high pressure air to the wing boxes 46 and 48 respectively. Sampler pipes 78 and 80 are connected to the extremity of a lower wing box 46 or 48 respectively, farthest removed from its respective intake 74 or 76.

The low pressure sampler pipes 34, 36, 38 and 40, connected to the low pressure air boxes, thus provide four conduits for sampling a small portion of the low pressure air supplied to different portions of the low pressure tempering fluid supply system. A pen recorder 82 comprising a continuously driven chart may be connected to all four pipes to record the instantaneous pressure blowing through each of the four sampler pipes in sequence.

Each of the sampler pipes ends in a pressure actuated diaphragm relay containing mercury switch 84, which is coupled in parallel by means of a relay 94 to a common alarm circuit 92. Switches 84 suitable for present purposes may be obtained on the open market as Mercoid PQ3 diaphragm pressure control switches. Each sampler pipe is also provided with a T-connection 86 leading into the inlet of a four-way selector valve 88.

Figure 4A:
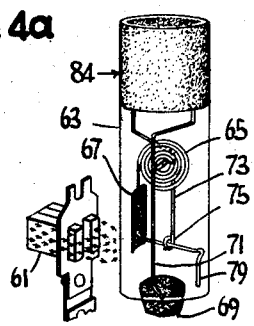
Figures 4a and 4b are views of a portion of a diaphragm actuated magnetic mercury switch forming a part of the present invention, showing the switch in open and closed position, respectively.
Figure 4B:
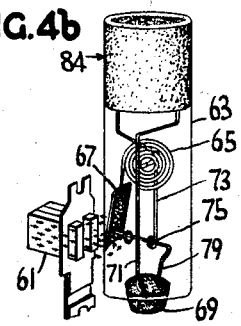

Referring to Figures 4a and 4b, the details of a typical diaphragm-actuated mercury magnetic switch 84 are shown. The switch comprises a diaphragm exposed to the pressure in one of the sampler pipes and a compounding mechanism (not shown) coupled mechanically between the diaphragm and a permanent magnet 61. Movement of the permanent magnet 61 relative to a phial 63 is controlled by the response of the diaphragm to the pressure within the sampler pipe. Phial 63 contains a coil spring 65, to one end of which is attached a thin magnetic plate 67. A specially shaped wire electrode 79 extends from the plate 67. A mercury pool 69 is located at the bottom of the phial 63. An electrical connector 71 is fixed to the mercury pool. Another electrical connector 73 ends in a loop 75 through which wire electrode 69 extends. When pressure upon the diaphragm falls below a preset critical value, the magnet moves to the right sufficiently to increase the magnetic field applied to thin magnetic plate 67 to cause the latter to move to the position shown in Figure 4b. Electrical connector 73 moves with plate 67 to contact both the mercury pool 69 and the loop 75, thus closing a relay circuit. When pressure is restored in the bleeder pipe, magnet 61 is moved to the left by the displacement of the diaphragm and its magnetic effect on plate 67 is reduced by virtue of the increased spacing therebetween. The coil spring 65 is thus enabled to move the plate 67 to bring movable electrode 79 out of contact with the mercury pool 69, since the force of the magnetic field from permanent magnet 61 opposing the action of the coil spring is reduced by virtue of the displacement of the magnet from the plate.

As seen in Figure 5, the four-way selector valve 88 may comprise a stator 91 having inlet apertures 93, 95, 97 and 99 each coupled to a different T-connection 86. Within the stator housing is a rotor 81 having an inlet port 83 rotatable into alignment with each of the inlet apertures and an outlet port 87 extending axially of the rotor. The outlet end of outlet port 87 is connected to a pipe 89 leading to a closed end manometer 90. Upon rotation of the rotor 81 relative to the stator 91, the inlet port 83 of the rotor may be brought into communication with any one of the T-connections of any of the sampler pipes, thereby selectively coupling any one of the pipes 34, 36, 38 and 40 to the manometer 90.

Each diaphragm relay switch 84 is maintained in opened position by the normal pressure sampled by the four sampler pipes 34, 36, 38 and 40. However, when the pressure in any one of these sampler pipes falls below the minimum at which the associated tempering nozzles should deliver air blasts to the glass, the diaphragm switch 84 activates relay 94 which closes alarm circuit 92. This alarm circuit includes a light 96 and a horn 98. Thus, whenever the pressure in any of the sampler lines falls below the desired minimum, one of the diaphragm relay switches 84 is closed, thereby actuating a relay 94, which in turn energizes light 96 and horn 98 of the common alarm circuit 92.

Similarly, sampler pipes 62, 64, 78 and 80, attached to the various wing boxes forming each branch of the high pressure system is connected through a T-junction 100 to a four-way selector valve 102 (similar to the four-way selector valve 88) which selectively couples any one of the four high pressure sampler lines to a manometer 104. Each high pressure sampler pipe terminates in a diaphragm relay switch 106, similar to the diaphragm relay switches 84 coupled to the low pressure bleeder pipes. A high pressure pen recorder 108, equipped with four recording pens, one for each high pressure sampler line, may be used to record the pressures in each of the sampler lines 62, 64, 78 and 80 on a movable chart.

The diaphragm switches 106 are connected in parallel to a relay 110 which also controls the common alarm circuit 92. However, diaphragm valves 106 are actuated to close the relay 110 whenever the pressure falls below the minimum required for operation for the high pressure system. Relay 110 is in parallel relation to relay 94 and hence serves to operate light 96 and horn 98 in an manner similar to that by which relay 94 actuates these indicating devices.

*Alarm silencing relay*

Since it is quite annoying to have horns resounding for any period of time in a factory, an alarm silencing relay 112 is included in the circuit 92 to allow manual deactivation of the horn 98 once it calls the attention of an operator to the fact that a low pressure condition exists in the tempering system and to insure that the horn will respond to future failures by automatically resetting it when pressures return to normal. Also, a hand operated switch 114 is included directly in the line that operates the alarm silencing relay 112 for safety purposes.

Figure 3:
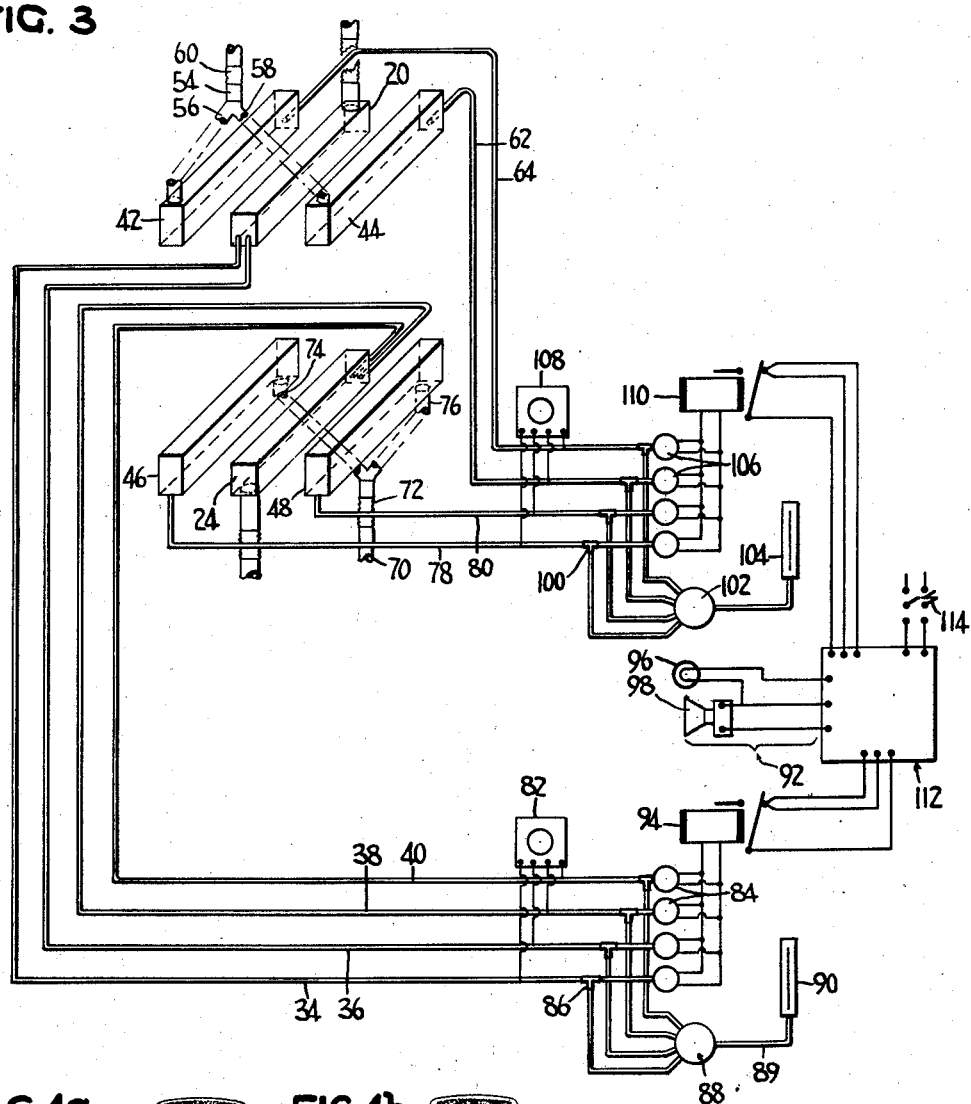
Figure 3 is a schematic sketch showing how the present invention may be incorporated with tempering apparatus to provide the desirable requisites of the present invention.

In a typical alarm silencing relay 112 depicted schematically in Figure 6, parallel diaphragm valve actuated relays 94 and 110 are each connected in series with lamp 96 as shown in Figure 3. The audible alarm 98 is connected in parallel across the lamp. A relay contact 116 is series connected to the audible alarm 98 in the alarm branch 98, 116. A push button 118 and a second relay contact 120 are coupled to relay contact 116 as shown in the figure.

When the light 96 is lit and the alarm 98 sounded, relay contact 116 is closed and relay contact 120 is opened. Pressing button 118 momentarily closes relay contact 120, and opens relay contact 116, thus opening the alarm circuit. When the pressure in all the lines resumes its minimum required level, relays 94 and 110 are both opened, which opens relay contact 120 and closes relay contact 116 while shutting off lamp 96. Thus, whenever the pressure in any portion of the system again falls below the minimum required for proper tempering at a later time, both the visual signal 96 and the audible signal 98 are activated once again.

*Operation of system*

Whenever any portion of the pressure system for either the high or the low pressure air boxes falls below the minimum pressure deemed critical for that portion of the tempering system, the pressure in one of the outlet sampler pipes drops. One of the diaphragm relay switches 84 or 106 closes in response to the reduced pressure, thus causing relay 94 or 110 to actuate the common alarm circuit 92, thereby sounding the horn 98 and lighting the light 96. Immediately upon hearing the horn or seeing the light flashing, personnel tending the apparatus observe the readings on the pen recorders 82 and 108 to determine which sampler pipe is sampling an insufficient pressure. Four-way valves 88 and 102 are aligned with each pipe in sequence, and the manometers 90 and 104 observed to verify the pen recorder readings. Once a portion of the system is shown to be defective, the area of search for the defect is localized, and the tempering oscillator can be repaired much more rapidly than if no indication of a leak location is given.

Also, by virtue of the immediate sounding of the horn and the lighting of the light in response to a failure in the system, the tempering operation may be stopped immediately until such time as the defect is corrected. Therefore, incomplete tempering between the time of the occurrence of a defect and the time the production lights are determined to be improperly tempered is eliminated. Therefore, according to the present invention there is less necessity for repeating the tempering process for those sheets which are inadvertently tempered improperly and any repairs in the tempering apparatus can be accomplished relatively quickly.

The particular embodiment of the present invention has been disclosed for purpose of illustration rather than limitation.

What is claimed is:

1. In apparatus for tempering glass comprising means for imparting blasts of tempering fluid to opposite surfaces of glass sheets, tempering fluid supply means and a warning system for indicating and locating a low pressure condition in the tempering fluid imparting means, said system comprising pipes each coupled at one end to a different localized portion of the tempering fluid imparting means for sampling a minute portion of the tempering fluid therefrom, a separate pressure actuated electrical switch coupled to each pipe, a relay coupled to said switches and actuated thereby whenever the pressure in the pipe coupled to said switches falls below a desirable minimum, an electrically operated alarm coupled to said relay and actuated in response thereto, said pressure actuated electrical switches being connected in parallel relation to each other, and pressure indicator means selectively connected to each one of the pipes to indicate the pressure of the fluid sampled therein.

2. In apparatus for tempering glass including means for imparting blasts of tempering fluid to opposite surfaces of a glass sheet, in combination, tempering fluid supply means and a warning system for detecting and locating a low pressure condition comprising pipes each connected at one end to a different localized portion of the tempering fluid imparting means for sampling a minute portion of the tempering fluid therefrom, a separate fluid pressure responsive electrical switch coupled to each of said pipes, each switch calibrated to remain in the open position when the fluid pressure in the pipe to which it is coupled is at least a minimum value desired for that part of the tempering fluid imparting means sampled by the pipe, and to move into the closed position when the pressure in the pipe falls below the desired minimum for that part of the tempering system, a common electrical circuit including an alarm electrically actuated upon closing any one of said pressure responsive switches coupled to said switches, and means constructed and arranged in operative association with each pipe for indicating in which pipe a switch responds to a pressure reduction to actuate the common circuit.

References Cited in the file of this patent

UNITED STATES PATENTS

| | | |
|---|---|---|
| 2,199,511 | Perry et al. | May 7, 1940 |
| 2,493,548 | Proctor | Jan. 3, 1950 |
| 2,608,029 | Glynn | Aug. 26, 1952 |